US010268876B2

(12) United States Patent
Ihara et al.

(10) Patent No.: US 10,268,876 B2
(45) Date of Patent: Apr. 23, 2019

(54) ATTRIBUTE FACTOR ANALYSIS METHOD, DEVICE, AND PROGRAM

(71) Applicant: NEC Solution Innovators, Ltd., Koto-ku, Tokyo (JP)

(72) Inventors: Yasuyuki Ihara, Tokyo (JP); Masashi Sugiyama, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 111 days.

(21) Appl. No.: 15/325,136

(22) PCT Filed: Jul. 17, 2014

(86) PCT No.: PCT/JP2014/069633
§ 371 (c)(1),
(2) Date: Jan. 10, 2017

(87) PCT Pub. No.: WO2016/009569
PCT Pub. Date: Jan. 21, 2016

(65) Prior Publication Data
US 2017/0177924 A1 Jun. 22, 2017

(51) Int. Cl.
*G06K 9/00* (2006.01)
*G06K 9/52* (2006.01)
(Continued)

(52) U.S. Cl.
CPC ..... *G06K 9/00268* (2013.01); *G06K 9/00288* (2013.01); *G06K 9/4642* (2013.01);
(Continued)

(58) Field of Classification Search
CPC .......... G06K 9/00221; G06K 9/00268; G06K 9/00288; G06K 9/4642; G06K 9/52;
(Continued)

(56) References Cited

U.S. PATENT DOCUMENTS 8,204,842 B1 * 6/2012 Zhang ............... G06F 17/30253
706/45
2010/0296706 A1 11/2010 Kaneda et al.
(Continued)

FOREIGN PATENT DOCUMENTS

JP   H11-066283 A   3/1999
JP   H11-175724 A   7/1999
(Continued)

OTHER PUBLICATIONS

Sugiyama, M, "Superfast-Trainable Multi-Class Probabilistic Classifier by Least-Squares Posterior Fitting", IEICE Transactions on Information and Systems, vol. E93-D, No. 10, pp. 2690-2701, 2010.
(Continued)

*Primary Examiner* — Ali Bayat

(57) ABSTRACT

This invention relates to an attribute factor analysis method, which is a method of analyzing a factor of an attribute based on a training sample set including training samples each being a combination of reference image data and attribute data associated with the reference image data. The attribute factor analysis method includes: a division step of dividing an image region of the reference image data constituting each training sample of the training sample set into parts of a predetermined sample size in a mesh shape; a model construction step of constructing a regression model by performing sparse regression analysis for each of the parts based on the reference sample set; a dependency calculation step of calculating, with use of the regression model, for each training sample of the training sample set, a dependency between an explanatory variable representing a feature quantity of reference image data on each part and an objective variable representing the attribute data, to obtain an attribute factor analyzed result; and a visualization step of
(Continued)

visualizing the attribute factor analyzed result to produce the visualized attribute factor analyzed result.

14 Claims, 11 Drawing Sheets

(51) Int. Cl.
*G06K 9/62* (2006.01)
*G06K 9/46* (2006.01)

(52) U.S. Cl.
CPC ............ *G06K 9/52* (2013.01); *G06K 9/6244* (2013.01); *G06K 9/6256* (2013.01); *G06K 2009/4666* (2013.01)

(58) Field of Classification Search
CPC .... G06K 9/6244; G06K 9/6256; G06K 9/627; G06K 2009/4666; G06K 2009/00322; G06K 2009/6236
See application file for complete search history.

(56) References Cited

U.S. PATENT DOCUMENTS

| | | | |
|---|---|---|---|
| 2012/0045137 | A1 | 2/2012 | Ueki et al. |
| 2012/0051629 | A1* | 3/2012 | Ueki ............... G06K 9/00221 382/159 |
| 2014/0089236 | A1* | 3/2014 | Lee .................... G06K 9/6231 706/12 |
| 2014/0140584 | A1* | 5/2014 | Lee .................... G06K 9/00248 382/118 |
| 2015/0366328 | A1* | 12/2015 | Tamura ............... A45D 44/00 434/100 |

FOREIGN PATENT DOCUMENTS

| | | |
|---|---|---|
| JP | 2010-271872 | 12/2010 |
| JP | 4742192 B2 | 8/2011 |

OTHER PUBLICATIONS

Ihara, Y., Sugiyama, M., Ueki, K., and Fujita, M. "Multi-Race Age Estimation Based on the Combination of Multiple Classifiers", Proceedings of Dynamic Image Processing for Real Application Workshop 2011 (DIA2011), pp. 317-322, Tokushima, Mar. 3-4, 2011.
R. Herbrich, T. Graepel and K. Obermayer,"Large Margin Rank Boundaries for Ordinal Regression", Advances in Large Margin Classifiers, Cambridge, MA, MIT Press, pp. 115-132 (Mar. 26, 2000).
Suzuki, T., Sugiyama, M., Sese, J., & Kanamori, T. "Approximating Mutual Information by Maximum Likelihood Density Ratio Estimation", In Y. Saeys, H. Liu, I. Lnza, L. Wehenkel, and Y. Van de Peer (Eds.), Proceedings of the Workshop on New Challenges for Feature Selection in Data Mining and Knowledge Discovery 2008 (FSDM2008), JMLR Workshop and Conference Proceeding, vol. 4, pp. 5-20, 2008.
Suzuki, T., Sugiyama, M., Kanamori, T., & Sese, J. "Mutual Information Estimation Reveals Global Associations between Stimuli and Biological Processes", BMC Bioinformatics, vol. 10, No. 1, pp. S52, 2009.
Draft Version for: Tomioka, R., Suzuki, T. and Sugiyama, M. "Augmented Lagrangian Methods for Learning, Selecting, and Combining Features, Optimization for Machine Learning", MIT Press, Cambridge, MA, USA, chapter 9, pp. 255-283 (2011).
Tomioka, R., Suzuki, T., and Sugiyama, M. "Optimization algorithms for sparse regularization and multiple kernel learning and their applications to image recognition", "Image Lab", Apr. 2010, pp. 5-11, Japan Industrial Publishing.
R. Tibshirani, "Regression Shrinkage and Selection via the Lasso", Journal of the Royal Statistical Society, Series B, vol. 58, No. 1, pp. 267-288, 1996.
Zou, H. and Hastie, T., "Regularization and variable selection via the elastic net", Journal of the Royal Statistical Society B, 67, 2005, pp. 301-320.
Yusuke Shinohara, Nobuyuki Otsu, "Facial Expression Recognition Using Fisher Weight Maps", IEICE Technical Report, Mar. 11, 2004 (Mar. 11, 2004), vol. 103, No. 737, pp. 79 to 84.
Satoshi Hirata, Hitoshi Iyatomi, "Preliminary experiments on quantification of facial attractiveness", Proceedings of FIT2013 12th Forum on Information Technology, vol. 3, Aug. 20, 2013 (Aug. 20, 2013), pp. 111 to 112.
Yasuhiro Imai, Shinji Ozawa, "The Impression classification of the Face for fit Hairstyle", The Papers of Joint Technical Meeting on Information Processing and Information Oriented Industrial System, The Institute of Electrical Engineers of Japan, May 27, 2005 (May 27, 2005), pp. 1 to 5.
Shoji Harada et al., "On Constructing Shape Feature Space for Interpreting Subjective Expressions", Transactions of information Processing Society of Japan, May 15, 1999 (May 15, 1999), vol. 40, No. 5, pp. 2356 to 2366.
International Search Report for PCT Application No. PCT/JP2014/069633, dated Oct. 14, 2014.
English translation of Written opinion for PCT Application No. PCT/JP2014/069633.

\* cited by examiner

ATTRIBUTE FACTOR ANALYSIS METHOD, DEVICE, AND PROGRAM

This application is a National Stage Entry of PCT/JP2014/069633 filed on Jul. 17, 2014, the content of all of which is incorporated herein by reference, in its entirety.

TECHNICAL FIELD

This invention relates to a method of estimating an attribute of an object, e.g., a person, and more particularly, to a method, a device, and a program for analyzing a factor of an attribute.

BACKGROUND ART

In recent years, studies of estimating attributes (sex, age, expression, etc.) of a person based on a face image of the person have developed significantly. Among others, estimation of sex and age is used for applications, such as marketing strategies, security, and amusement, and is commercialized.

For example, there is known "supervised learning" as a technique of machine learning (for example, refer to Patent Literature 1). In supervised learning, a case data set containing combinations each comprising input data (observed data) and output data (implication, attribute, or result of observed data) is regarded as "advice from a supervisor", and a machine (computer) learns based on the case data set. The phrase "learning" in this context means creating a function model for predicting or estimating output for input data whose output is unknown.

Next, a specific description will be given taking face image recognition as an example. In this face image recognition, a description is given of a case in which sex (one of human attributes) is estimated based on a face image.

At the time of learning, a computer constructs a function model based on a case data set containing face images of females and males. At the time of evaluation, when a face image (for example, female face image) whose sex is unknown is supplied, the computer produces "female" as its sex based on the input data and the function model.

Further, in Patent Literature 2, there is disclosed an "age estimation device, method, and program," which are capable of obtaining a recognized result close to a result that a human being perceives. In the age estimation device disclosed in Patent Literature 2, in creating a model for age estimation by regression analysis, a learning weight for young adults is increased to improve estimation accuracy for young adults. Specifically, in Patent Literature 2, in a supervised regression problem of predicting a true age of test data, which is an extraction source of a feature vector, kernel regularized weighted least squares (KRWLS) is used to model an age estimation function by a linear combination of positive definite kernels.

There is also known a classifier with high learning efficiency called a least square probabilistic classifier (LSPC) (for example, refer to Non Patent Literature 1 and Non Patent Literature 2). The LSPC is a classification technique in which a posterior probability model of classes is learned under a squared loss. The greatest feature of the LSPC is being capable of calculating the solution analytically. Further, in the LSPC, a posterior probability is directly estimated in a form of a density ratio for each class, and hence also has the feature of being robust to unbalance of the number of pieces of learning data of the respective classes. In the LSPC, the posterior probability is learned using the squared loss. In this manner, with the LSPC, learning time can be reduced by several hundred times while maintaining pattern recognition accuracy at the same level of related-art techniques. Further, the LSPC is less susceptible to a deviation in number of pieces of data of a particular class.

Further, ranking learning is also known. In this context, the "ranking learning" is an optimization technique in the framework of supervised learning so that data can be given a high score depending on the degree and order of relevance. For example, as a representative example of the ranking learning based on a pairwise approach, a ranking support vector machine (ranking SVM) is known (for example, refer to Non Patent Literature 3). In the ranking SVM, a loss for a learning data pair is taken into consideration to reduce to a two-class classification problem of the SVM, to thereby optimize a score function.

As a method of calculating a magnitude of a correlation between an explanatory variable representing a feature quantity of an object and an objective variable representing an attribute or a result, there are known, for example, a method of calculating a correlation value in a sub-space (one-dimension) of canonical correlation analysis (CCA), maximum likelihood mutual information (MLMI), which is a method of calculating mutual information (MI) (for example, refer to Non Patent Literature 4), or least-squares mutual information (LSMI), which is a method of calculating squared-loss mutual information (SMI) (for example, refer to Non Patent Literature 5).

There is also known a technique of optimizing a sparse regression model (for example, refer to Non Patent Literature 6 and Non Patent Literature 7).

CITATION LIST

Patent Literature

Patent Literature 1: JP-A-H11-175724
Patent Literature 2: JP-B-4742192

Non Patent Literature

Non Patent Literature 1: Sugiyama, M, "Superfast-trainable multi-class probabilistic classifier by least-squares posterior fitting," IEICE Transactions on Information and Systems, vol. E93-D, no. 10, pp. 2690-2701, 2010
Non Patent Literature 2: Ihara, Y., Sugiyama, M., Ueki, K., and Fujita, M. "Multi-race age classification by weighted combination of multiple classifiers", Proceedings of Dynamic Image Processing for Real Application Workshop 2011 (DIA2011), pp. 317-322, Tokushima, 2011.3.3-4.
Non Patent Literature 3: R. Herbrich, T. Graepel and K. Obermayer: "Large margin rank boundaries for ordinal regression", Advances in Large Margin Classifiers, Cambridge, Mass., MIT Press, pp. 115-132 (2000)
Non Patent Literature 4: Suzuki, T., Sugiyama, M., Sese, J., & Kanamori, T. "Approximating Mutual Information by Maximum Likelihood Density Ratio Estimation" In Y. Saeys, H. Liu, I. Lnza, L. Wehenkel, and Y. Van de Peer (Eds.), Proceedings of the Workshop on New Challenges for Feature Selection in Data Mining and Knowledge Discovery 2008 (FSDM2008), JMLR Workshop and Conference Proceeding, vol. 4, pp. 5-20, 2008
Non Patent Literature 5: Suzuki, T., Sugiyama, M., Kanamori, T., & Sese, J. "Mutual Information Estimation Reveals Global Associations between Stimuli and Biological Processes" BMC Bioinformatics, vol. 10, no. 1, pp. S52, 2009

Non Patent Literature 6: Tomioka, R., Suzuki, T. and Sugiyama, M. "Augmented Lagrangian Methods for Learning, Selecting, and Combining Features, Optimization for Machine Learning" MIT Press, Cambridge, Mass., USA, chapter 9, pp. 255-283 (2011)

Non Patent Literature 7: Tomioka, R., Suzuki, T., and Sugiyama, M. "Optimization algorithms for sparse regularization and multiple kernel learning and their applications to image recognition", "Image Lab", April 2010, pp. 5-11, Japan Industrial Publishing.

Non Patent Literature 8: R. Tibshirani, "Regression shrinkage and subset selection with the lasso," Journal of the Royal Statistical Society, Series B, vol. 58, no. 1, pp. 267-288, 1996.

Non Patent Literature 9: Zou, H. and Hastie, T., "Regularization and variable selection via the elastic net", Journal of the Royal Statistical Society B, 67, 2005, pp. 301-320.

SUMMARY OF INVENTION

Problem to be Solved by Invention

In Patent Document 1 described above, output (e.g., sex) can only be estimated based on the input data (face image). Also in Patent Document 2 described above, age is merely estimated from input data (face image). Further, in each of Non Patent Literatures 1 to 3 described above, an attribute of unknown data is merely estimated.

Stated differently, in the related-art supervised learning described above, there are merely disclosed technologies for estimating (producing) an attribute (impression perceived by many people) of a face based on the entire face. In other words, a factor of the attribute (main reason why data has the attribute) is not determined.

OBJECT OF THE INVENTION

It is an object of this invention to provide an attribute factor analysis method, device, and program, which are capable of analyzing a factor of an attribute of an object.

It is another object of this invention to provide an attribute estimation and attribute factor analysis method, device, and program, which are capable of not only estimating an attribute of an object but also analyzing a factor of the attribute.

Means to Solve the Problem

A first aspect of this invention is an attribute factor analysis method, which is a method of analyzing, with use of an attribute factor analysis device, a factor of an attribute based on a training sample set comprising training samples each being a combination of reference image data and attribute data associated with the reference image data, the attribute factor analysis method comprising: a division step of dividing an image region of the reference image data constituting each training sample of the training sample set into parts of a predetermined sample size in a mesh shape; a model construction step of constructing a regression model by performing sparse regression analysis for each of the parts based on the training sample set; a dependency calculation step of calculating, with use of the regression model, for each training sample of the training sample set, a dependency between an explanatory variable representing a feature quantity of reference image data on each part and an objective variable representing the attribute data, to obtain an attribute factor analyzed result; and a visualization step of visualizing the attribute factor analyzed result to produce the visualized attribute factor analyzed result.

A second aspect of this invention is an attribute estimation and attribute factor analysis method, which is a method of estimating an attribute of input image data and analyzing a factor of the attribute with use of an attribute estimation and attribute factor analysis device, the attribute estimation and attribute factor analysis method comprising: a division step of dividing an image region of reference image data constituting each training sample of a training sample set, the training sample set comprising training samples each being a combination of the reference image data and attribute data associated with the reference image data, into parts of a predetermined sample size in a mesh shape; a model construction step of constructing a regression model by performing sparse regression analysis for each of the parts based on the training sample set; an attribute estimation and dependency calculation step of estimating the attribute of the input image data with use of the regression model, and calculating, for the input image data, a dependency between an explanatory variable representing a feature quantity of input image data on each part and an objective variable representing the estimated attribute, to obtain an attribute estimated result and an attribute factor analyzed result of the input image data; and a visualization step of visualizing the attribute estimated result and the attribute factor analyzed result to produce the visualized attribute estimated result and attribute factor analyzed result.

Advantageous Effects of Invention

According to this invention, it is possible to analyze a factor of an attribute of an object.

MODES FOR EMBODYING THE INVENTION

First Example Embodiment

Figure 1:
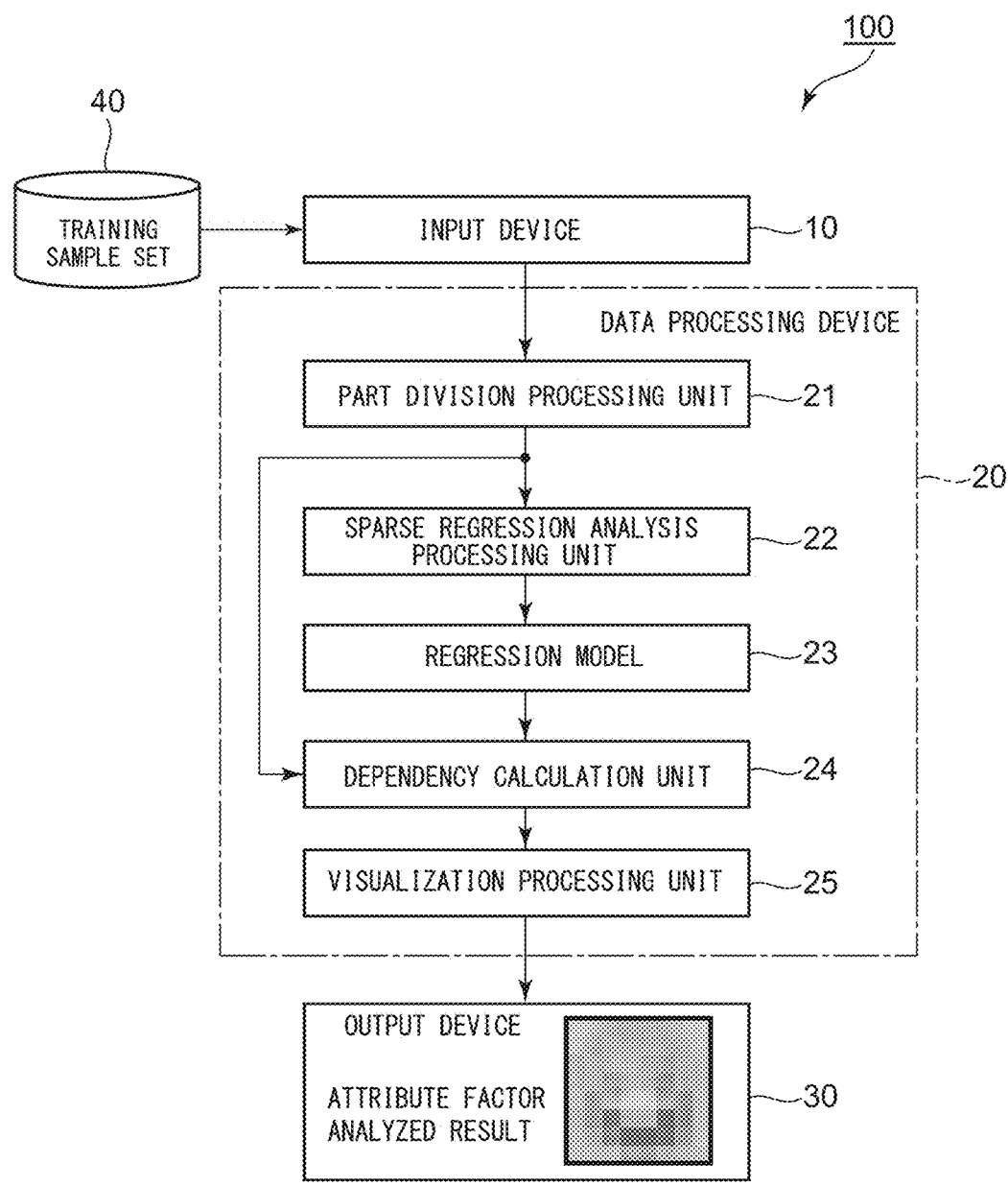
FIG. 1 is a block diagram for illustrating a configuration of an attribute factor analysis device according to a first example embodiment of this invention.

FIG. 1 is a block diagram for illustrating a configuration of an attribute factor analysis device 100 according to a first example embodiment of this invention. A description is simplified or omitted for a configuration having low relevance to this invention.

The illustrated attribute factor analysis device 100 can be realized by a computer configured to operate in accordance with program control. The attribute factor analysis device 100 comprises an input device 10 configured to input data, a data processing device 20, an output device 30 configured to produce a processed result of the data processing device 20, and an auxiliary storage device 40 configured to serve as various kinds of databases.

Although not shown, the data processing device 20 includes a read-only memory (ROM) storing a program, a random-access memory (RAM) to be used as a working memory temporarily storing data, and a central processing unit (CPU) configured to process data stored in the RAM in accordance with the program stored in the ROM.

The auxiliary storage device 40 is configured to accumulate data of a training sample set. The training sample set is a set containing training samples each comprising a combination of reference image data and attribute data associated with this reference image data. In this example, the number n of samples is, for example, 2,100. It is to be understood that the number of samples is not limited thereto.

Further, in the illustrated example, the reference image data is face image data. Further, the attribute data is data representing impressions of appearances of faces of people.

The reference image data is not necessarily face image data, but normalization processing is performed on all the image data. In this context, the normalization processing means performing positioning at a particular part. For example, when the reference image data is face image data, the normalization processing means performing positioning at both eyes.

The illustrated attribute factor analysis device 100 comprises a device configured to analyze whether or not there is a dependency (correlation) between the feature of face-part data and an impression of an appearance.

The input device 10 is configured to input a training sample set stored in the auxiliary storage device 40 into the data processing device 20.

The data processing device 20 comprises a part division processing unit 21, a sparse regression analysis processing unit 22, a memory 23 storing a regression model to be described later, a dependency calculation unit 24, and a visualization processing unit 25.

The part division processing unit 21 is configured to divide an image region of reference image data contained in each training sample of the training sample set into parts of a predetermined sample size in a mesh shape.

The sparse regression analysis processing unit 22 is configured to perform sparse regression analysis for each of the parts based on the training sample set to construct a regression model to be described later. The constructed regression model is stored in the memory 23. The memory 23 may comprise a hard disk, for example.

The dependency calculation unit 24 is configured to calculate, with use of the regression model, for each training sample of the training sample set, a dependency between an explanatory variable X representing a feature quantity of reference image data on each part and an objective variable Y representing the attribute data, to obtain an attribute factor analyzed result.

The visualization processing unit 25 is configured to visualize the attribute factor analyzed result, and produce the visualized attribute factor analyzed result to the output device 30.

Next, a description will be given in detail of an operation of each processing unit of the data processing device 20.

Figure 2:
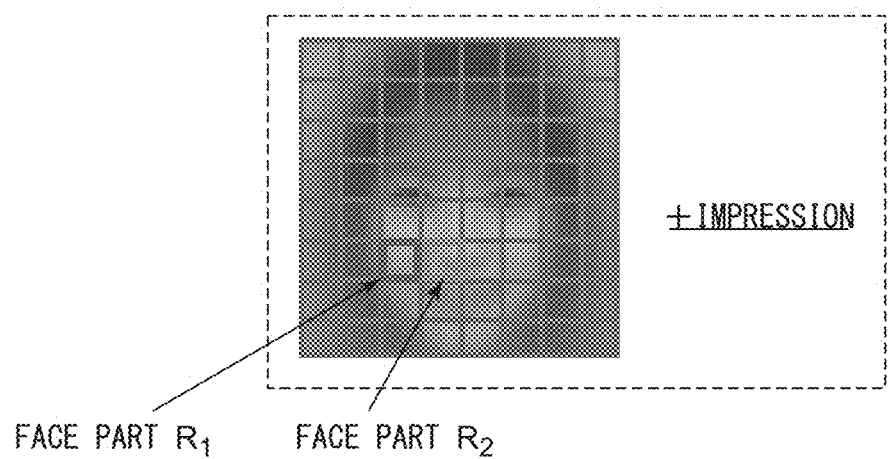
FIG. 2 is a diagram for illustrating one example of a training sample relating to a face image.

FIG. 2 is a diagram for illustrating one example of a training sample relating to a face image. The training sample comprises a combination of the explanatory variable X representing a feature quantity of face image data and the objective variable Y representing an attribute "impression" of a face. As described above, in the case of this example, data of 2,100 training samples of this kind is accumulated in the auxiliary storage device 40.

The part division processing unit 21 determines a part division method (mesh division method) of the explanatory variable X in accordance with the purpose of analysis, customer needs, and the like. In this example, the part division processing unit 21 first normalizes the face image data at a position of both eyes for all the 2,100 face image samples. In this example, one piece of image data comprises (64×64) pixels.

Next, the part division processing unit 21 divides the normalized face image data into pieces of block image data of (8×8) pixels. Thus, in the case of this example, the part division processing unit 21 obtains 64 pieces of block image data as illustrated in FIG. 2.

Respective pieces of block image data are represented by a face part $R_1$ and a face part $R_2$ as illustrated in FIG. 2, for example. Therefore, in this example, the total number K of face parts $R_1$ to $R_K$ equals 64.

A feature vector x of the entire face image is expressed by feature vectors of the respective face parts in a divided manner as in Expression (1) below.

$$x = [x^{(1)T} | x^{(2)T} | \ldots | x^{(K)T}]^T \qquad (1)$$

where T represents a transpose, and the feature vector x of the entire face image is formed of an n-by-K matrix.

In this case, an elaborated part division technique needs to be used. This point will be described later.

The sparse regression analysis processing unit 22 is configured to perform sparse regression analysis for each of the parts determined by the part division processing unit 21 based on the training sample set to construct a regression model expressed by Expression (2) below.

$$f_\Gamma(x) = \sum_{i=1}^{n} \sum_{j=1}^{K} \gamma_{i,j} K(x^{(j)}, x_i^{(j)}) \qquad (2)$$

where $\Gamma = \{\gamma_{i,j}\}_{1 \leq i \leq n, 1 \leq j \leq K}$, $x^{(j)}$ represents a feature quantity of input data, and $x_i^{(j)}$ represents a feature quantity of a training sample. A kernel function defined by the feature quantity for each face part is expressed by a Gaussian kernel as in Expression (3) below.

$$K(x^{(j)}, x_i^{(j)}) = \exp\left(-\frac{\|x^{(j)} - x_i^{(j)}\|^2}{2\sigma^2}\right) \quad (3)$$

where σ represents a Gaussian width.

Next, a technique of optimizing the regression model will be described. For the regression model, an optimal solution may be obtained by the least absolute shrinkage and selection operator (LASSO) technique (refer to Non Patent Literature 8 described above) or the elastic net technique (refer to Non Patent Literature 9 described above). In this context, the LASSO technique is a technique of solving an optimization problem expressed by Expression (4) below, to which an L1 regularization term is added.

$$\hat{\Gamma} = \underset{\Gamma}{\text{argmin}} \left[\sum_{i=1}^{n}(y_i - f_{\Gamma}(x_i))^2 + \lambda \sum_{i=1,j=1}^{n,K} |\gamma_{i,j}|\right] \quad (4)$$

where the first term on the right side represents a squared error, and the second term on the right side represents a regularization term for suppressing overlearning. λ represents a normalization parameter. Further, the elastic net is a technique of solving an optimization problem expressed by Expression (5) below, which is obtained by adding an L2 regularization term to the right side of Expression (4).

$$\hat{\Gamma} = \underset{\Gamma}{\text{argmin}} \left[\sum_{i=1}^{n}(y_i - f_{\Gamma}(x_i))^2 + \lambda \sum_{i=1,j=1}^{n,K} |\gamma_{i,j}| + \mu \sum_{i=1,j=1}^{n,K} |\gamma_{i,j}|^2\right] \quad (5)$$

Examples of the optimization techniques for obtaining the LASSO solution and the elastic net solution include dual augmented Lagrangian (DAL) (refer to Non Patent Literatures 6 and 7 described above). The LASSO technique has an advantage of being capable of obtaining a sparse solution (with most coefficient vectors γ being zero) because the origin in an L1 norm is indifferentiable. As a result, the estimation processing is performed at high speed, and there is an advantage that a face region having a high dependency on the attribute is likely to be selected. However, it has been pointed out that the LASSO technique has a problem in that variables with collinearity are less likely to be selected. Therefore, in order to complement this problem, the elastic net, with which variables with high collinearity are also likely to be selected, is used in some cases. σ (Gaussian width) and λ and μ (regularization parameters) are selected by a cross validation method.

The feature quantity of image data comprises any one selected from feature quantities including RGB, gray scale, Laplacian, and Haar-like feature quantity. Further, each part uses a common feature quantity.

Further, in the first example embodiment, four kinds of feature quantities of image data are given, but this invention is not limited thereto. It is to be understood that other feature quantities may be used.

The dependency calculation unit 24 is configured to calculate, with use of the regression model constructed by the sparse regression analysis processing unit 22, for each training sample of the training sample set, a dependency score between a face part j (explanatory variable X) and an attribute (objective variable Y). The dependency score is defined by Expression (6) below.

$$\sum_{i=1}^{n} |\gamma_{i,j}| \quad (6)$$

The dependency calculation unit 24 is configured to produce the dependency score as an attribute factor analyzed result. In this manner, a difference in attribute factors among pieces of data may be known.

The visualization processing unit 25 is configured to visualize the attribute factor analyzed result, which is produced from the dependency calculation unit 24, to produce the visualized attribute factor analyzed result to the output device 30. In this context, the attribute factor analyzed result refers to a region extracted as a factor of the attribute.

Figure 3:
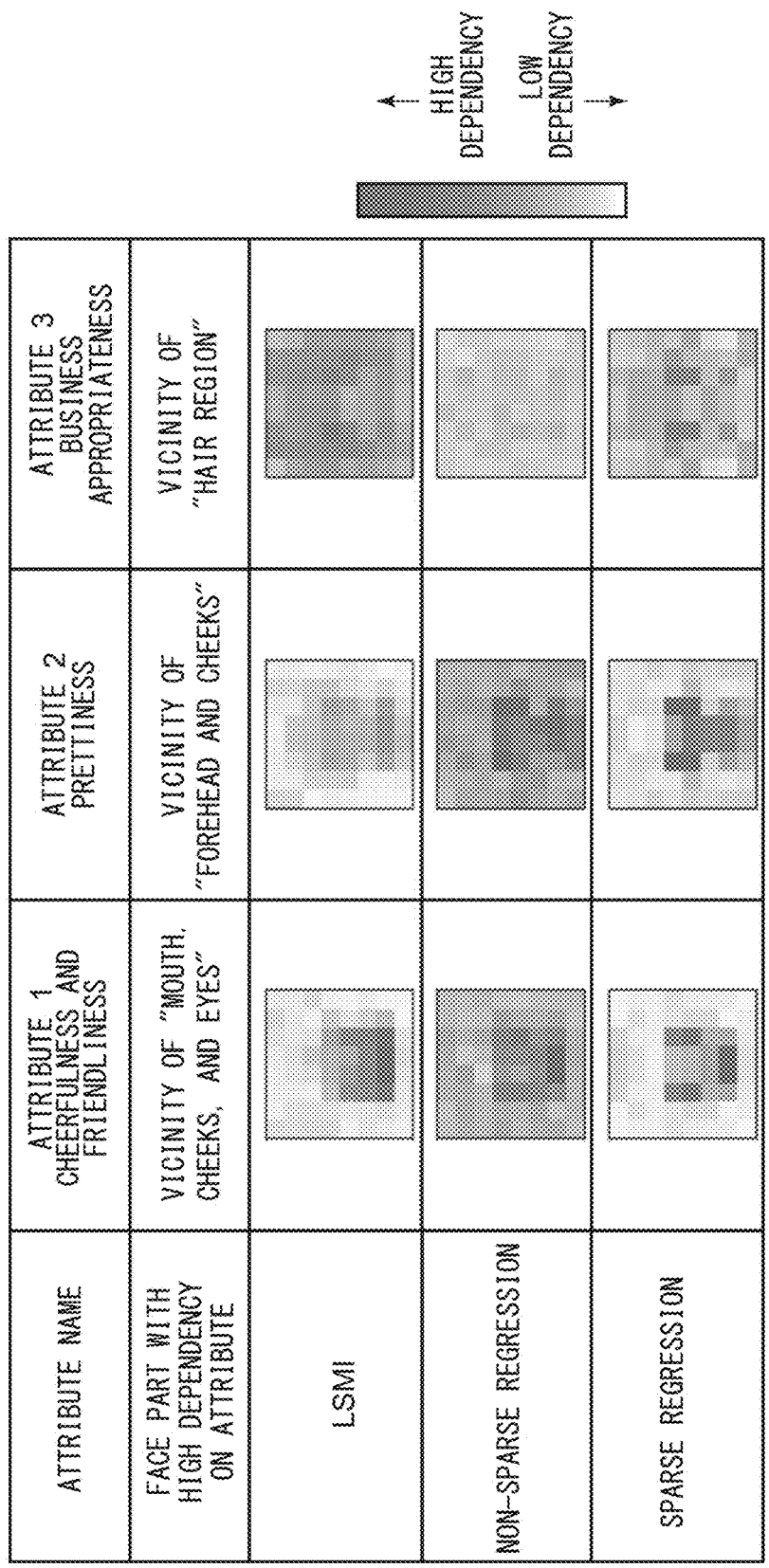
FIG. 3 is a diagram for illustrating an example of an attribute factor analysis result that is visualized by a visualization processing unit of FIG. 1 together with attribute factor analysis results obtained by other techniques.

To be more specific, the visualization processing unit 25 visualizes the magnitude of a numerical value of the dependency score for each block image (part), which is calculated by the dependency calculation unit 24, in a matrix (color-matrix) form as illustrated in FIG. 3.

In FIG. 3, not only the example of visualization in the case of the first example embodiment (sparse regression) of this invention, but also examples of visualization in the case of non-sparse regression and the case of least-squares mutual information (LSMI) are illustrated. In this example, as the non-sparse regression, L2-regularized kernel regression analysis is used. The LSMI is disclosed in Non Patent Literature 5 described above.

In FIG. 3, as the attribute (impression), an example of three kinds of attributes, namely, "attribute 1", "attribute 2", and "attribute 3", is illustrated. An illustration is given of an example of visualization of the attribute factor analyzed result when the impression of the attribute 1 is "cheerfulness and friendliness". An illustration is given of an example of visualization of the attribute factor analyzed result when the impression of the attribute 2 is "prettiness". An illustration is given of an example of visualization of the attribute factor analyzed result when the impression of the attribute 3 is "business appropriateness".

As illustrated in FIG. 3, as the numerical value indicating the magnitude of a dependency becomes larger, the color becomes stronger (colored to a deep red). Further, through visualization of the attribute factor analyzed result, it is possible to explain a difference in magnitude of a dependency for each part in an easy-to-understand manner.

It is understood from FIG. 3 that, in the first example embodiment (sparse regression) of this invention, a tendency that is very similar to the LSMI is exhibited. Further, the first example embodiment (sparse regression) of this invention is better than the non-sparse regression in selecting face parts having high dependencies on the attributes.

For example, when the impression of the attribute 1 is "cheerfulness and friendliness", the attribute factor analyzed result indicates that the dependency is large in the vicinity of the mouth, cheeks, and eyes. In other words, it is indicated that the vicinity of the mouth, cheeks, and eyes is a decisive factor of the impression "cheerfulness and friendliness".

Further, when the impression of the attribute 2 is "prettiness", the attribute factor analyzed result indicates that the dependency is large in the vicinity of the forehead and the chin. In other words, it is indicated that the vicinity of the forehead and the chin is a decisive factor of the impression "prettiness".

Further, when the impression of the attribute 3 is "business appropriateness", the attribute factor analyzed result indicates that the dependency is large in the vicinity of the hair region. In other words, it is indicated that the vicinity of the hair region is a decisive factor of the impression "business appropriateness".

The following points are understood as an overall tendency based on FIG. 3.

First, depending on the face part, a high dependency on impression is found. To be more specific, it is understood that parts having high dependencies on a particular impression are almost the same (such as eyes and mouth).

Next, the position of a face part having a high dependency is different depending on the kind of impression.

In the first example embodiment, three kinds of impressions of a face are given, but this invention is not limited thereto. It is to be understood that at least one impression may be selected from those three kinds of impressions, or another impression may be used.

The respective units of the attribute factor analysis device 100 according to the first example embodiment may be implemented by using a combination of hardware and software. In an embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100 configured in this manner according to the first example embodiment can analyze the factor of an attribute (impression) of an object (face of a person).

Second Example Embodiment

Figure 4:
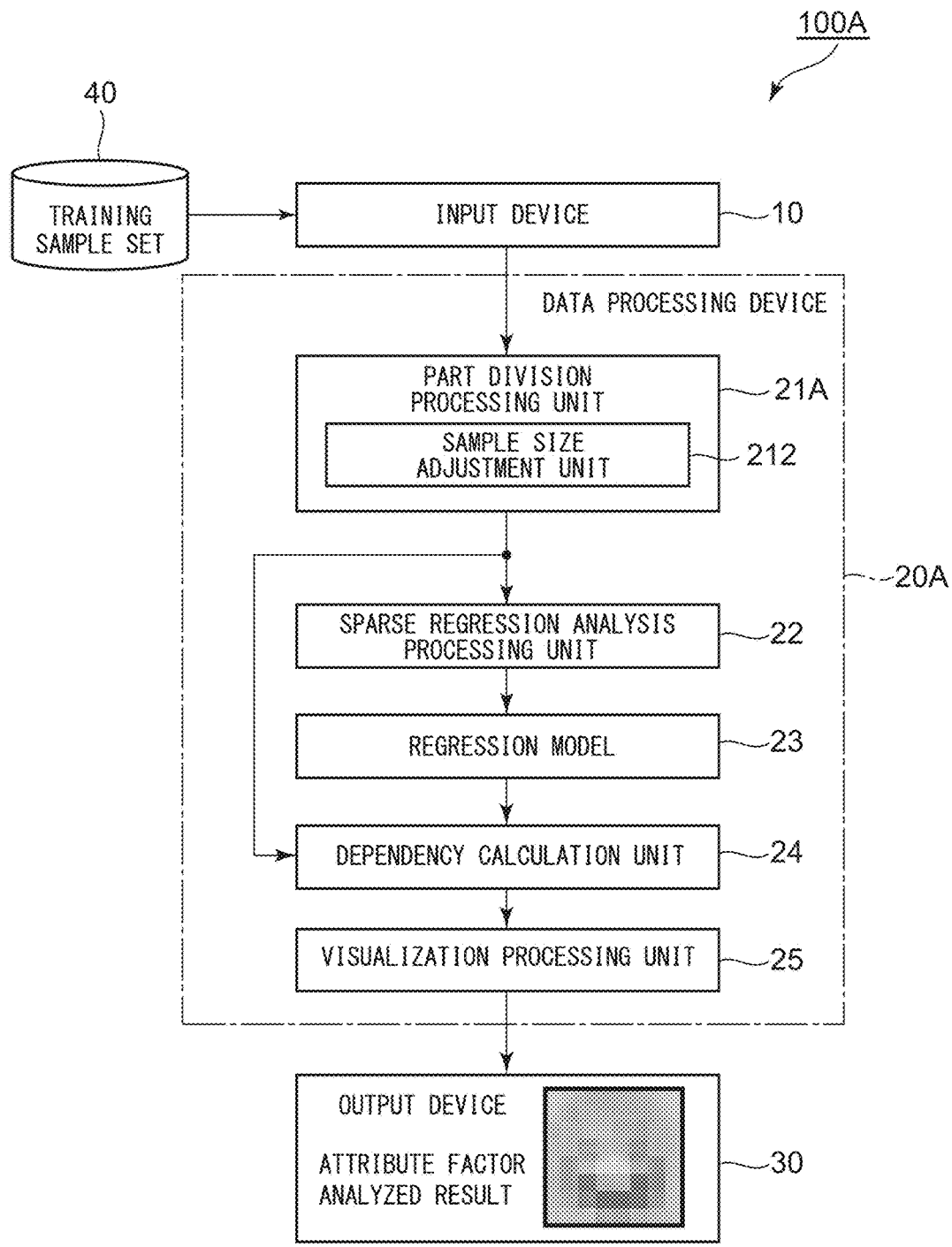
FIG. 4 is a block diagram for illustrating a configuration of an attribute factor analysis device according to a second example embodiment of this invention.

FIG. 4 is a block diagram for illustrating a configuration of an attribute factor analysis device 100A according to a second example embodiment of this invention. A description is simplified or omitted for a configuration having low relevance to this invention.

The illustrated attribute factor analysis device 100A can be realized by a computer configured to operate in accordance with program control. The attribute factor analysis device 100A comprises the same configuration as the attribute factor analysis device 100 illustrated in FIG. 1 for operation except that the configuration of the data processing device is different as described later. Thus, the data processing device is denoted by a reference numeral 20A. The same components as those illustrated in FIG. 1 are denoted by the same reference numerals, and a description thereof is omitted for the sake of simplicity of description.

The illustrated data processing device 20A comprises the same configuration as the data processing device 20 illustrated in FIG. 1 for operation except that the configuration of the part division processing unit is different as described later. Thus, the part division processing unit is denoted by a reference numeral 21A.

In addition to performing the part division processing by the part division processing unit 21 illustrated in FIG. 1, the part division processing unit 21A further includes a sample size adjustment unit 212 configured to calculate in advance the magnitude of the correlation between the explanatory variable X and the objective variable Y for each piece of part data, and to adjust a sample size.

Next, an operation of the sample size adjustment unit 212 will be described in more detail.

Figure 5:
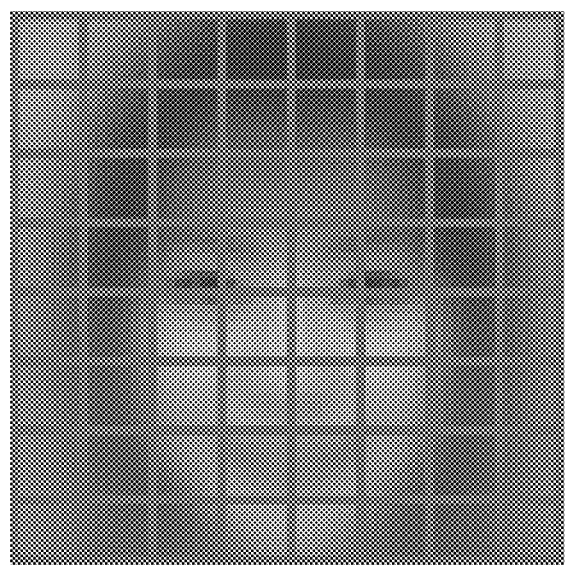
FIG. 5 is a diagram for illustrating adjustment of a sample size.

As illustrated in FIG. 5, the magnitude of a sample size (in the case of FIG. 5, the size of block image data) needs to be determined in advance appropriately. In the case of FIG. 5, each piece of block image data comprises (8×8) pixels. Further, the image region of image data is divided into parts of (8×8) pixels in a mesh shape. That is, each piece of image data is divided into 64 pieces of block image data.

When the sample size is too small, the magnitudes of the correlation cannot be compared. That is, the correlation with the objective variable Y is extremely small for every piece of part data.

In contrast, when the sample size is too large, the original purpose of analysis cannot be achieved. In other words, it is difficult to identify a part having a high relevance to the objective variable Y.

In view of this, the sample size adjustment unit 212 calculates in advance the magnitude of the dependency (correlation) between the explanatory variable X and the objective variable Y for each piece of part data while appropriately changing the sample size, and specifies an appropriate sample size while adjusting a balance between "variance of dependencies (correlation values) for respective parts (the larger the better)" and "size of a part to be analyzed (the smaller the better)".

The respective units of the attribute factor analysis device 100A according to the second example embodiment may be implemented by using a combination of hardware and software. In the embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100A configured in this manner according to the second example embodiment can easily analyze the factor of an attribute (impression) of an object (face of a person).

Third Example Embodiment

Figure 6:
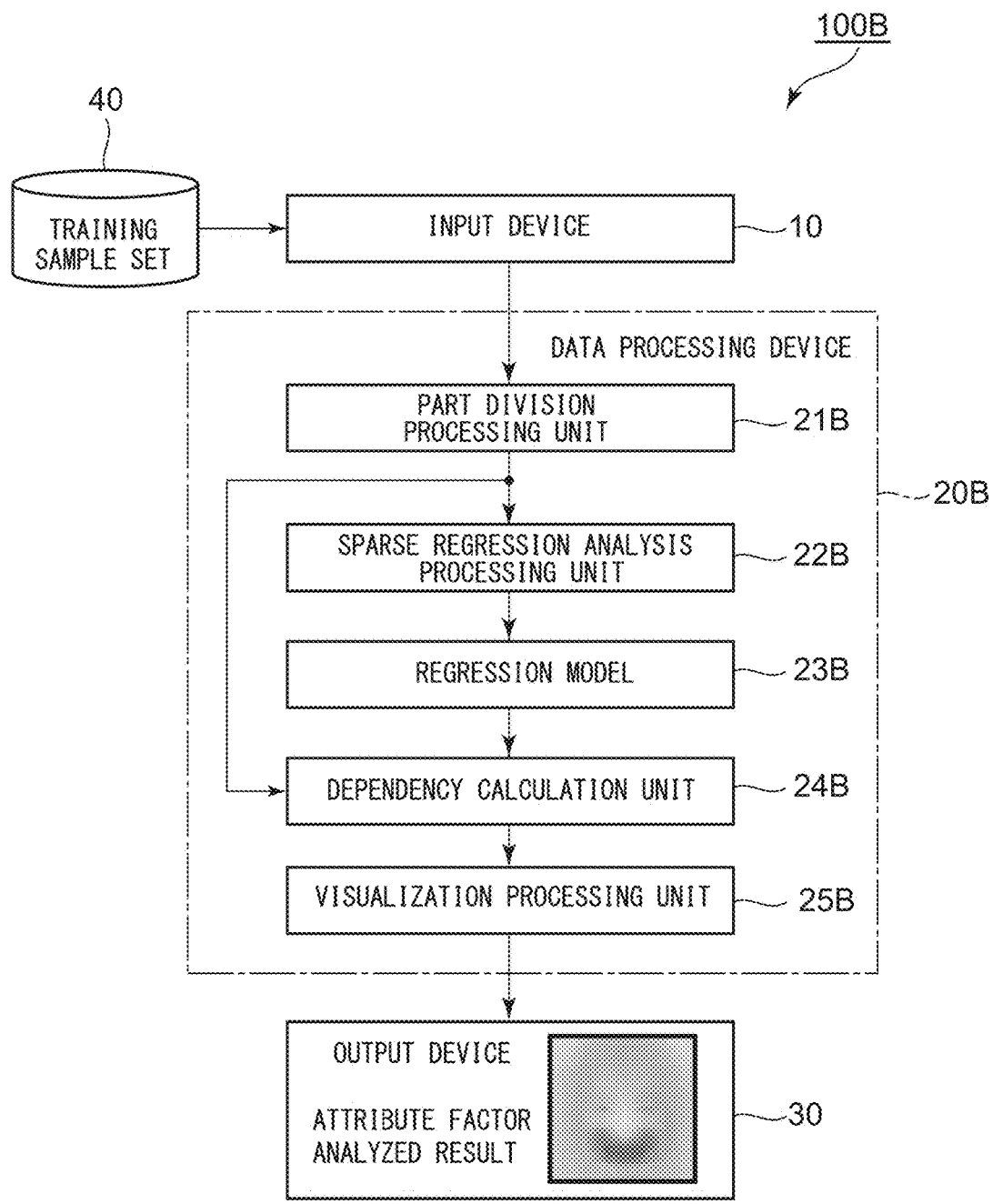
FIG. 6 is a block diagram for illustrating a configuration of an attribute factor analysis device according to a third example embodiment of this invention.

FIG. 6 is a block diagram for illustrating a configuration of an attribute factor analysis device 100B according to a third example embodiment of this invention. A description is simplified or omitted for a configuration having low relevance to this invention.

The illustrated attribute factor analysis device 100B can be realized by a computer configured to operate in accordance with program control. The attribute factor analysis device 100B comprises the same configuration as the attribute factor analysis device 100 illustrated in FIG. 1 for operation except that the configuration of the data processing device is different as described later. Thus, the data processing device is denoted by a reference numeral 20B. The same components as those illustrated in FIG. 1 are denoted by the same reference numerals, and a description thereof is omitted for the sake of simplicity of description.

The illustrated data processing device 20B comprises a part division processing unit 21B, a sparse regression analysis processing unit 22B, a memory 23B, a dependency calculation unit 24B, and a visualization processing unit 25B.

The part division processing unit 21B is configured to divide an image region of reference image data into parts of a predetermined sample size while shifting a division position of the image region of the reference image data by a predetermined number of pixels.

The sparse regression analysis processing unit 22B is configured to obtain the above-mentioned regression model for each of the shifted parts. The obtained regression models are stored in the memory 23B.

The dependency calculation unit 24B is configured to calculate the above-mentioned dependencies in parallel for the above-mentioned respective shifted parts to obtain a plurality of attribute factor analyzed results.

The visualization processing unit 25B is configured to integrate (average) the plurality of attribute factor analyzed results, visualize the integrated attribute factor analyzed result, and produce the visualized attribute factor analyzed result to the output device 30.

In this manner, the attribute factor analysis device 100B according to the third example embodiment adjusts the division position.

Next, adjustment of this division position will be described in detail in comparison to the attribute factor analysis device 100 illustrated in FIG. 1.

Figure 7:
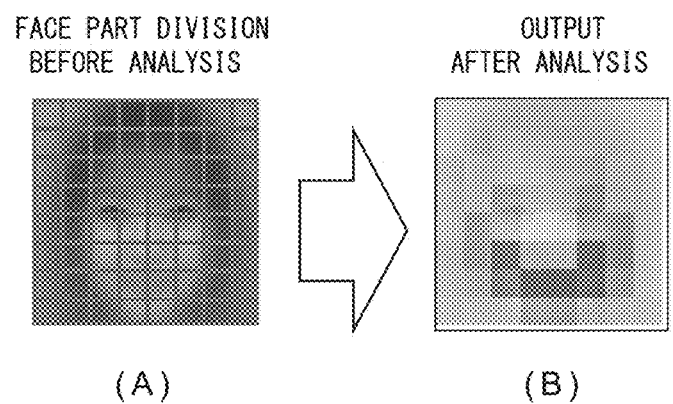
FIG. 7 are diagrams for illustrating a division position in the attribute factor analysis device illustrated in FIG. 1.

FIG. 7 are diagrams for illustrating a division position in the attribute factor analysis device 100 illustrated in FIG. 1. FIG. 7(A) is an illustration of pieces of image data divided by the part division processing unit 21. FIG. 7(B) is an illustration of an attribute factor analysis result (visualized by the visualization processing unit 25) obtained by the dependency calculation unit 24.

As described above, the division position of a part is not always located in an appropriate position.

In the case of FIG. 7(A), a division line passes through a center line of the eyebrows, the nose, and the mouth. Thus, as illustrated in FIG. 7(B), it is difficult to identify the magnitudes of a correlation with the objective variable Y for pieces of part data, namely, the entire eyebrows, the entire nose, and the entire mouth.

Figure 8:
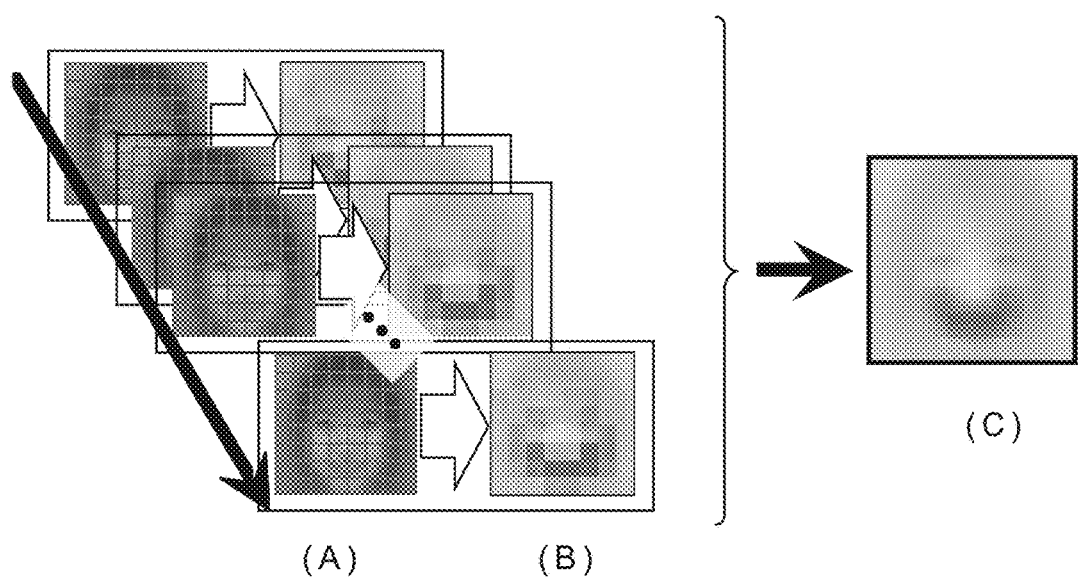
FIG. 8 are diagrams for illustrating adjustment of a division position in the attribute factor analysis device illustrated in FIG. 6.

FIG. 8 are diagrams for illustrating adjustment of a division position in the attribute factor analysis device 100B illustrated in FIG. 6. FIG. 8(A) is an illustration of a plurality of divided pieces of image data, which are obtained by the part division processing unit 21B shifting the division position. FIG. 8(B) is an illustration of a plurality of attribute factor analyzed results, which are obtained by the dependency calculation unit 24B calculating dependencies in parallel. FIG. 8(C) is an illustration of an integrated attribute factor analyzed result visualized by the visualization processing unit 25B.

As illustrated in FIG. 8(A), the part division processing unit 21B is configured to divide the image region of image data into parts of a predetermined sample size while shifting the division position thereof by a number of pixels (e.g., 2 pixels).

The sparse regression analysis processing unit 23B is configured to obtain the above-mentioned regression model for each of the shifted parts.

As illustrated in FIG. 8(B), the dependency calculation unit 24B is configured to calculate the above-mentioned dependencies in parallel for the above-mentioned respective shifted parts to obtain a plurality of attribute factor analyzed results.

As illustrated in FIG. 8(C), the visualization processing unit 25B is configured to integrate (average pixels at the same position) the plurality of attribute factor analyzed results (color matrix), visualize the integrated attribute factor analyzed result, and produce the visualized attribute factor analyzed result to the output device 30.

In this manner, through integration of the plurality of attribute factor analyzed results (color matrix), it is possible to present a comprehensible integrated (averaged) attribute factor analyzed result (color matrix) that exhibits a gradient in display (red display).

The respective units of the attribute factor analysis device 100B according to the third example embodiment may be implemented by using a combination of hardware and software. In the embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100B configured in this manner according to the third example embodiment can analyze a factor of an attribute (impression) of an object (face of a person) in an easy-to-understand manner.

Fourth Example Embodiment

Figure 9:
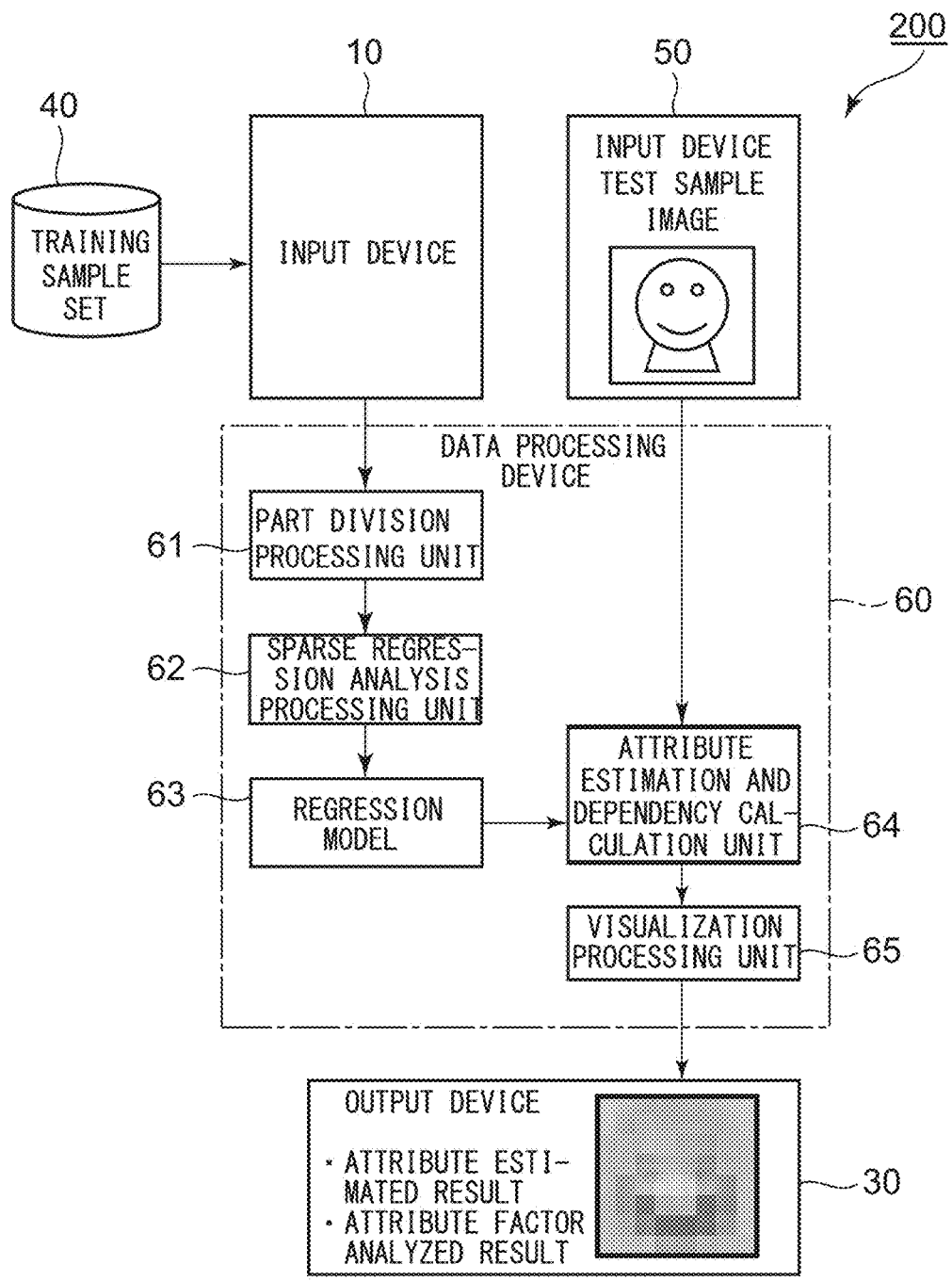
FIG. 9 is a block diagram for illustrating a configuration of an attribute estimation and attribute factor analysis device according to a fourth example embodiment of this invention.

FIG. 9 is a block diagram for illustrating a configuration of an attribute estimation and attribute factor analysis device 200 according to a fourth example embodiment of this invention. A description is simplified or omitted for a configuration having low relevance to this invention.

The illustrated attribute estimation and attribute factor analysis device 200 can be realized by a computer configured to operate in accordance with program control. The attribute estimation and attribute factor analysis device 200 includes a first input device 10 configured to input data, a data processing device 60, an output device 30 configured to produce a processed result from the data processing device 60, an auxiliary storage device 40 configured to function as various kinds of databases, and a second input device 50 configured to input data.

Although not shown, the data processing device 60 comprises a read-only memory (ROM) storing a program, a random access memory (RAM) to be used as a working memory temporarily storing data, and a central processing unit (CPU) configured to process data stored in the RAM in accordance with the program stored in the ROM.

The auxiliary storage device 40 is configured to accumulate data of a training sample set. The training sample set is a set of training samples each comprising a combination of reference image data and attribute data associated with the reference image data. In this example, the number n of samples is, for example, 2,100. It is to be understood that the number of samples is not limited thereto.

The second input device 50 is configured to input input image data (test sample images).

Further, in the illustrated example, the reference image data and the input image data (test sample images) comprise face image data. Further, the attribute data comprises data representing impressions of appearances of faces of people.

The reference image data and the input image data (test sample images) are not necessarily face image data, but normalization processing is performed on all the image data. In this context, the normalization processing means performing positioning at a particular part. For example, when the reference image data and the input image data (test sample images) are face image data, the normalization processing means performing positioning at both eyes.

The illustrated attribute estimation and attribute factor analysis device 200 comprises a device configured to estimate an attribute of input image data (test sample image) and analyze a factor of the attribute.

The first input device 10 is configured to input the training sample set, which is stored in the auxiliary storage device 40, into the data processing device 60. The second input device 50 is configured to input the input image data (test sample images) into the data processing device 60 as described above.

The data processing device 60 comprises a part division processing unit 61, a sparse regression analysis processing unit 62, a memory 63 storing a regression model, an attribute estimation and dependency calculation unit 64, and a visualization processing unit 65.

The part division processing unit 61 is configured to divide an image region of reference image data contained in each training sample of the training sample set into parts of a predetermined sample size in a mesh shape.

The sparse regression analysis processing unit 62 is configured to perform sparse regression analysis for each of the parts based on the training sample set to construct a regression model. The constructed regression model is stored in the memory 63. The memory 63 may comprise a hard disk, for example.

The attribute estimation and dependency calculation unit 64 is configured to estimate, with use of the regression model, the attribute of the input image data, and to calculate a dependency between an explanatory variable X representing a feature quantity of input image data on each part and an objective variable Y representing the estimated attribute to obtain an attribute estimated result and an attribute factor analyzed result of the input image data.

The visualization processing unit 65 is configured to visualize the attribute estimated result and the attribute factor analyzed result to produce the visualized attribute estimated result and attribute factor analyzed result to the output device 30.

Next, a description will be given in detail of an operation of each processing unit of the data processing device 60.

Operations of the part division processing unit 61, the sparse regression analysis processing unit 62, and the memory 63 are similar to the operations of the part division processing unit 21, the sparse regression analysis processing unit 22, and the memory 23 of FIG. 1, and hence a description thereof is omitted.

The attribute estimation and dependency calculation unit 64 is configured to estimate, with use of the regression model constructed by the sparse regression analysis processing unit 62 (and stored in the memory 63), an attribute of input image data (test sample) $x_{te}$, and to calculate a dependency score between a face part j (explanatory variable X) and an attribute (objective variable Y) for the input image data (test sample) $x_{te}$. The dependency score is defined by Expression (7) below.

$$\sum_{i=1}^{n} |\gamma_{i,j}| K(x_{te}^{(j)}, x_i^{(j)}) \qquad (7)$$

The attribute estimation and dependency calculation unit 64 is configured to produce an attribute estimated result, and to produce the dependency score as an attribute factor analyzed result. In this manner, an attribute factor for unknown data (test sample) $x_{te}$ may be known.

The visualization processing unit 65 is configured to visualize the attribute estimated result and the attribute factor analyzed result, which are produced by the attribute estimation and dependency calculation unit 64, to produce the visualized attribute estimated result and attribute factor analyzed result to the output device 30.

Figure 10:
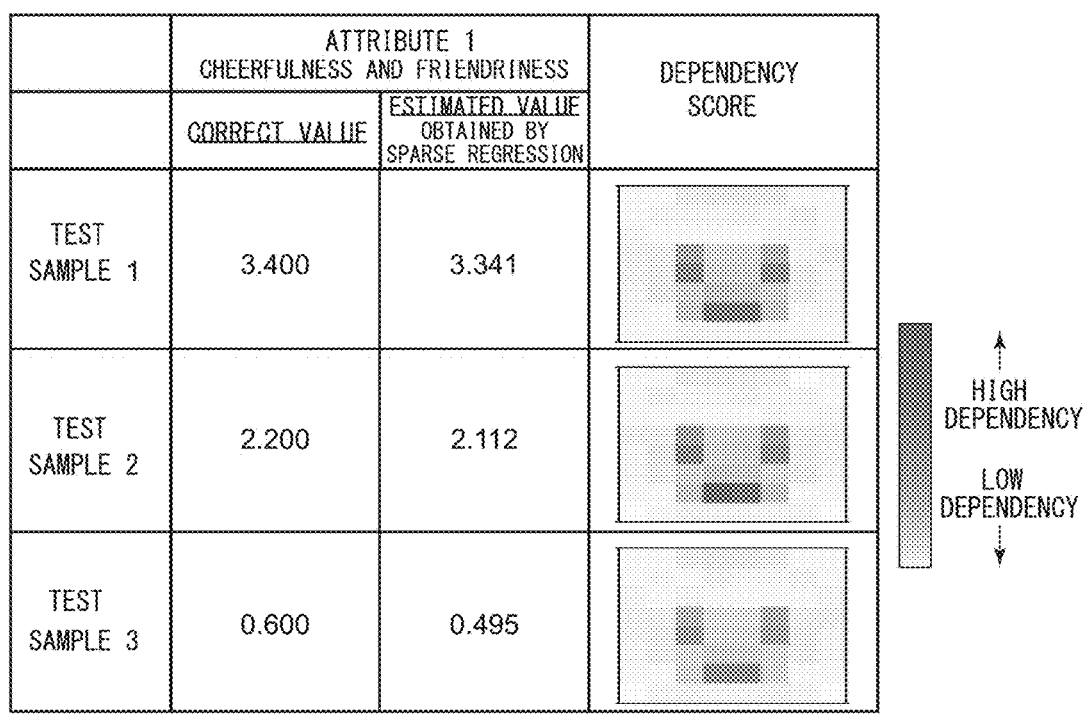
FIG. 10 is a diagram for illustrating examples of an attribute estimation result and an attribute factor analysis result that are visualized by a visualization processing unit of FIG. 9 together with correct values.

To be more specific, the visualization processing unit 65 visualizes a numerical value of the attribute estimated result and the magnitude of a numerical value of the dependency score for each block image (part), which are calculated by the attribute estimation and dependency calculation unit 64, in a matrix (color-matrix) form as illustrated in FIG. 10.

In FIG. 10, not only the fourth example embodiment (estimated values obtained by sparse regression) of this invention in the case in which three kinds of test samples, namely, "test sample 1", "test sample 2", and "test sample 3", are input as the test sample $x_{te}$, but also correct values are illustrated. In this example, there is illustrated an example in which the estimated attribute is the impression of the attribute 1, that is, "cheerfulness and friendliness". Further, an example in which the attribute (impression) of a person is in a range of from 0.0 to 4.0 is illustrated. In other words, 0.0 means "not cheerful or friendly at all", and 4.0 means "very cheerful and friendly".

As illustrated in FIG. 10, in any of the test samples, the estimated values obtained by the sparse regression are substantially equal to the correct values. Further, as the numerical value indicating the magnitude of a dependency score becomes larger, the color becomes stronger (colored to a deep red). Further, through visualization of the attribute factor analyzed result (dependency score), it is possible to explain a difference in magnitude of a dependency for each part in an easy-to-understand manner. Based on FIG. 10, it is understood that tendencies are slightly different for each test sample.

As described above, the attribute estimation and attribute factor analysis device 200 may analyze and visualize a relationship between the regression output and the attribute factor.

The respective units of the attribute estimation and attribute factor analysis device 200 according to the fourth example embodiment may be implemented by using a combination of hardware and software. In the embodiment employing a combination of hardware and software, the respective units are implemented as various kinds of means by operating a piece of hardware, e.g., a control unit (CPU), based on an attribute estimation and attribute factor analysis program stored in the ROM. Further, the attribute estimation and attribute factor analysis program may be recorded in a recording medium for distribution. The attribute estimation and attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute estimation and attribute factor analysis device 200 configured in this manner according to the fourth example embodiment can not only estimate the attribute (impression) of the object (face of a person), but also analyze the factor of the attribute (impression).

Fifth Example Embodiment

Figure 11:
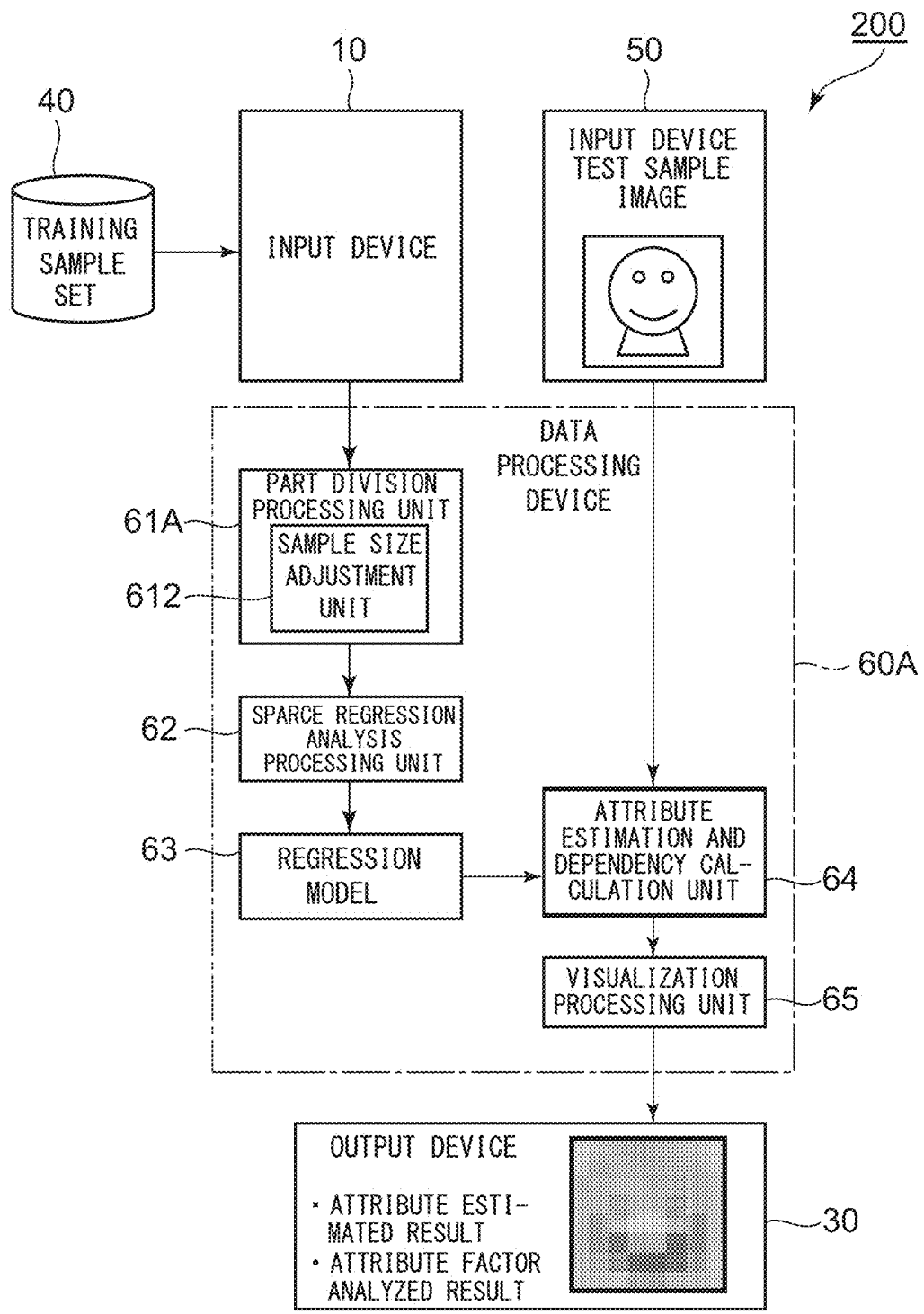
FIG. 11 is a block diagram for illustrating a configuration of an attribute estimation and attribute factor analysis device according to a fifth example embodiment of this invention.

FIG. 11 is a block diagram for illustrating a configuration of an attribute estimation and attribute factor analysis device 200A according to a fifth example embodiment of this invention. A description is simplified or omitted for a configuration having low relevance to this invention.

The illustrated attribute estimation and attribute factor analysis device 200A can be realized by a computer configured to operate in accordance with program control. The attribute estimation and attribute factor analysis device 200A comprises the same configuration as the attribute estimation and attribute factor analysis device 200 illustrated in FIG. 9 for operation except that the configuration of the data processing device is different as described later. Thus, the data processing device is denoted by a reference numeral 60A. The same components as those illustrated in FIG. 9 are denoted by the same reference numerals, and a description thereof is omitted for the sake of simplicity of description.

The illustrated data processing device 60A comprises the same configuration as the data processing device 60 illustrated in FIG. 9 for operation except that the configuration of the part division processing unit is different as described later. Thus, the part division processing unit is denoted by a reference symbol 61A.

In addition to performing the part division processing in the part division processing unit 61 illustrated in FIG. 9, the part division processing unit 61A further includes a sample size adjustment unit 612 configured to adjust the sample size by calculating in advance a magnitude of a correlation between the explanatory variable X and the objective variable Y for the data on each part.

Next, an operation of the sample size adjustment unit 612 is similar to the operation of the sample size adjustment unit 212 illustrated in FIG. 4, and hence a description thereof is omitted.

The respective units of the attribute estimation and attribute factor analysis device 200A according to the fifth embodiment may be implemented by using a combination of hardware and software. In the embodiment employing a combination of hardware and software, the respective units are implemented as various kinds of means by operating a piece of hardware, e.g., a control unit (CPU), based on an attribute estimation and attribute factor analysis program stored in the ROM. Further, the attribute estimation and attribute factor analysis program may be recorded in a recording medium for distribution. The attribute estimation and attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute estimation and attribute factor analysis device 200A configured in this manner according to the fifth example embodiment can not only estimate the attribute (impression) of the object (face of a person), but also easily analyze the factor of the attribute (impression).

Sixth Example Embodiment

Figure 12:
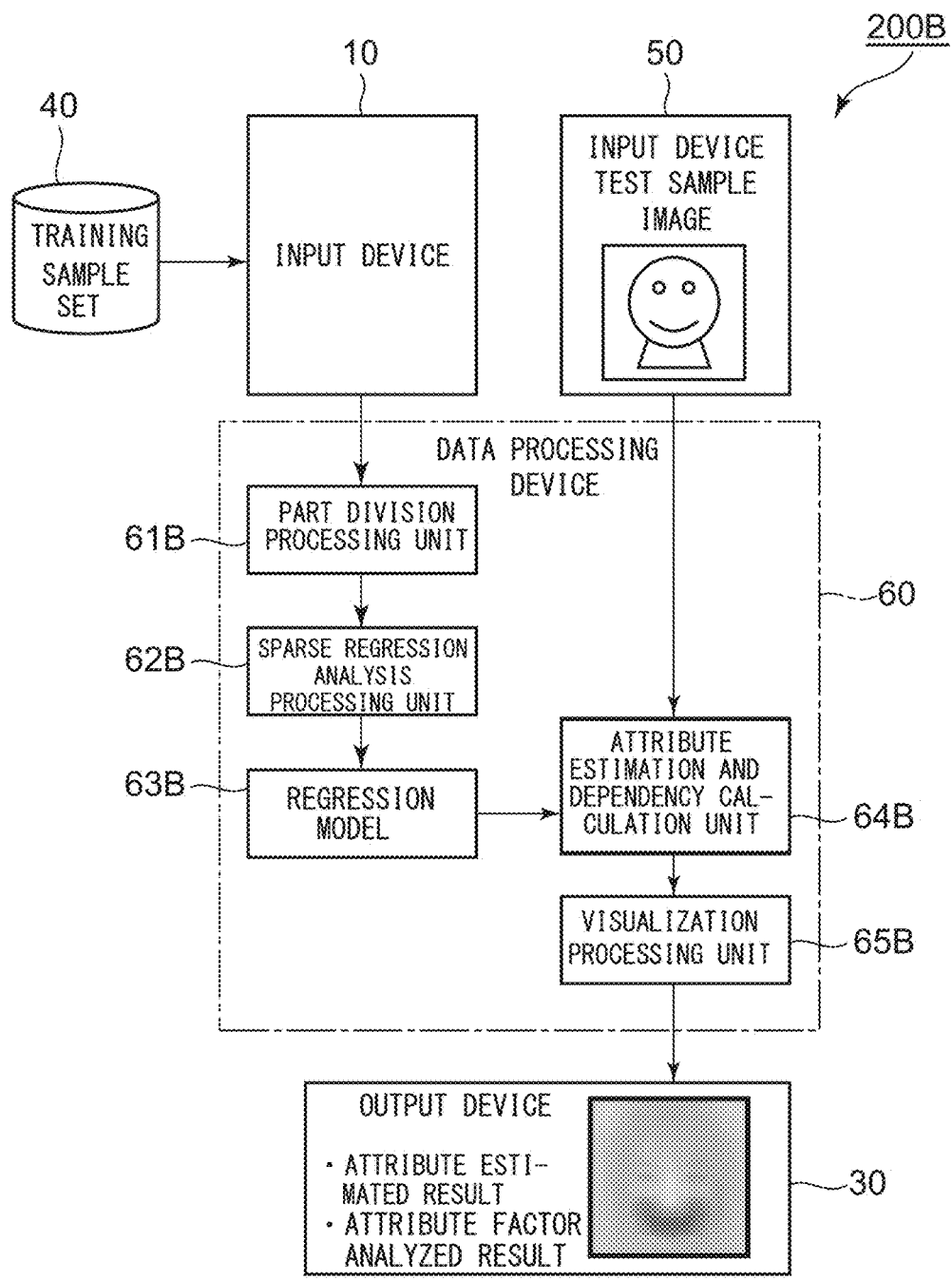
FIG. 12 is a block diagram for illustrating a configuration of an attribute estimation and attribute factor analysis device according to a sixth example embodiment of this invention.

FIG. 12 is a block diagram for illustrating a configuration of an attribute estimation and attribute factor analysis device 200B according to a sixth example embodiment of this invention. A description is simplified or omitted for a configuration having low relevance to this invention.

The illustrated attribute estimation and attribute factor analysis device 200B can be realized by a computer configured to operate in accordance with program control. The attribute estimation and attribute factor analysis device 200B comprises the same configuration as the attribute estimation and attribute factor analysis device 200 illustrated in FIG. 9 for operation except that the configuration of the data processing device is different as described later. Thus, the data processing device is denoted by a reference numeral 60B. The same components as those illustrated in FIG. 9 are denoted by the same reference numerals, and a description thereof is omitted for the sake of simplicity of description.

The illustrated data processing device 60B comprises a part division processing unit 61B, a sparse regression analysis processing unit 62B, a memory 63B, an attribute estimation and dependency calculation unit 64B, and a visualization processing unit 65B.

The part division processing unit 61B is configured to divide, for each training sample of the training sample set, an image region of reference image data into parts of a predetermined sample size while shifting a division position of the image region of the reference image data by a predetermined number of pixels.

The sparse regression analysis processing unit 62B is configured to obtain the above-mentioned regression model for each of the shifted parts. The obtained regression models are stored in the memory 63B.

The attribute estimation and dependency calculation unit 64B is configured to estimate the above-mentioned attributes and calculate the above-mentioned dependencies in parallel for the above-mentioned respective shifted parts to obtain a plurality of attribute estimated results and a plurality of attribute factor analyzed results.

The visualization processing unit 65B is configured to integrate (average) the plurality of attribute estimated results and the plurality of attribute factor analyzed results, visualize the integrated attribute estimated result and attribute factor analyzed result, and produce the visualized attribute estimated result and attribute factor analyzed result to the output device 30.

As described above, in the attribute estimation and attribute factor analysis device 200B according to the sixth example embodiment, the division position is adjusted. This adjustment of the division position is similar to that described with reference to FIG. 7 and FIG. 8, and hence a description thereof is omitted.

In this manner, through the integration of the plurality of attribute estimated results, it is possible to estimate the attribute more accurately, and through the integration of the plurality of attribute factor analyzed results (color matrix), it is possible to present a comprehensible integrated (averaged) attribute factor analyzed result (color matrix) that exhibits a gradient in display (red display).

The respective units of the attribute estimation and attribute factor analysis device 200B according to the sixth example embodiment may be implemented by using a combination of hardware and software. In the embodiment employing a combination of hardware and software, the respective units are implemented as various kinds of means by operating a piece of hardware, e.g., a control unit (CPU), based on an attribute estimation and attribute factor analysis program stored in the ROM. Further, the attribute estimation and attribute factor analysis program may be recorded in a recording medium for distribution. The attribute estimation and attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute estimation and attribute factor analysis device 200B configured in this manner according to the sixth example embodiment can not only estimate the attribute (impression) of the object (face of a person) more accurately, but also analyze the factor of the attribute (impression) in an easy-to-understand manner.

In the example embodiments described above, processing of the example embodiments may be executed by installing on a computer information stored in a computer-readable storage medium, which is coded with an instruction executable by a program, software, or a computer. The storage medium includes a transmission medium configured to temporarily record and hold data, e.g., a network, in addition to a portable recording medium such as an optical disc, a floppy (trademark) disk, and a hard disk.

Modified Example

This invention has been described with reference to the example embodiments, but this invention is not limited to the example embodiments described above. Various kinds of modifications understandable by a person skilled in the art can be made to the configuration and details of this invention within the scope of this invention.

For example, in the example embodiments described above, a description is given with an example of a case in which the image region of each piece of image data is a square, but the image region of each piece of image data may be a rectangle.

Further, in the example embodiments described above, the square image region of each piece of image data is divided into 64 pieces of square block image data of 8×8 pixels, but it is to be understood that the shape of block image data and the number of divisions are not limited thereto. For example, in general, a rectangle image region of each piece of image data may be divided into (M×N) pieces of, namely, M-by-N rectangle block image data. In this case, M and N are first and second integers of 2 or more, respectively. It is preferred that the first integer M and the second integer N be each 6 or more because too large a sample size inhibits the original purpose of analysis from being achieved.

Further, in the example embodiments described above, a plurality of divided pieces of block image data have the same sample size, but it is to be understood that the sample sizes may be different from one another. Specifically, the image region of each piece of image data may be divided into a plurality of pieces of block image data of different sample sizes so that the division line does not pass through a characteristic part (e.g., mouth, eyes, and nose) of a face.

Further, in the example embodiments described above, a description is given with an example of a case in which the image data is face image data and the attribute is an impression of a face, but it is to be understood that this invention is not limited thereto. The image data may be image data other than the face image data, and the attribute may be an attribute other than the impression.

INDUSTRIAL APPLICABILITY

This invention can be applied to, for example, a make-up simulation or giving flexible advice on make-up improvement in accordance with the intention (e.g., an ideal image) of a customer.

REFERENCE SIGNS LIST 10 input device
20, 20A, 20B data processing device
21, 21A, 21B part division processing unit
212 sample size adjustment unit
22, 22B sparse regression analysis processing unit
23, 23B memory (regression model)
24, 24B dependency calculation unit
25, 25B visualization processing unit
30 output device
40 auxiliary storage device (training sample set)
50 input device (test sample image)
60, 60A, 60B data processing device
61, 61A, 61B part division processing unit
612 sample size adjustment unit
62, 62B sparse regression analysis processing unit
63, 63B memory (regression model)
64, 64B attribute estimation and dependency calculation unit
65, 65B visualization processing unit
100, 100A, 100B attribute factor analysis device
200, 200A, 200B attribute estimation and attribute factor analysis device

What is claimed is:

1. An attribute factor analysis method, which is a method of analyzing, with use of an attribute factor analysis device, a factor of an attribute based on a training sample set comprising training samples each being a combination of reference image data and attribute data associated with the reference image data, the reference image data comprising face image data, the attribute data comprising data representing an impression of an appearance of a face, the attribute factor analysis method comprising:
   normalizing the face image data at a position of both eyes of the face to produce normalized face image data;
   dividing an image region of the normalized face image data constituting each training sample of the training sample set into parts of a predetermined sample size in a mesh shape;
   constructing a regression model by performing sparse regression analysis for each of the parts based on the training sample set;
   calculating, with use of the regression model, for each training sample of the training sample set, a dependency between an explanatory variable representing a feature quantity of the face image data on each part and an objective variable representing the attribute data, to obtain an attribute factor analyzed result;
   visualizing the attribute factor analyzed result to produce the visualized attribute factor analyzed result; and
   analyzing whether or not there is the dependency between the feature quantity of a face-part of the normalized face image data and the impression of the appearance of the face.

2. The attribute factor analysis method according to claim 1, wherein the dividing comprises adjusting the predetermined sample size by calculating in advance a magnitude of a correlation between the explanatory variable and the objective variable for the normalized face image data on each part.

3. The attribute factor analysis method according to claim 1,
wherein the dividing comprises dividing the image region of the normalized face image data into the parts of the predetermined sample size while shifting a division position of the image region of the normalized face image data by a predetermined number of pixels,
wherein the constructing comprises obtaining the regression model for each of the shifted parts,
wherein the calculating comprises calculating the dependencies in parallel for the respective shifted parts to obtain a plurality of attribute factor analyzed results, and
wherein the visualizing comprises integrating the plurality of attribute factor analyzed results, visualizing the integrated attribute factor analyzed result, and producing the visualized attribute factor analyzed result.

4. The attribute factor analysis method according to claim 1, wherein the feature quantity of the face image data comprises any one selected from feature quantities comprising RGB, gray scale, Laplacian, and Haar-like feature quantity.

5. An attribute factor analysis device, which is configured to analyze a factor of an attribute based on a training sample set comprising training samples each being a combination of reference image data and attribute data associated with the reference image data, the reference image data comprising face image data, the attribute data comprising data representing an impression of an appearance of a face, the attribute factor analysis device comprising:
a memory that stores the training sample set;
processing circuitry configured to:
normalize the face image data at a position of both eyes of the face to produce normalized face image data;
divide an image region of the normalized face image data constituting each training sample of the training sample set into parts of a predetermined sample size in a mesh shape;
perform sparse regression analysis for each of the parts based on the training sample set to construct a regression model;
calculate, with use of the regression model, for each training sample of the training sample set, a dependency between an explanatory variable representing a feature quantity of the face image data on each part and an objective variable representing the attribute data, to obtain an attribute factor analyzed result;
visualize the attribute factor analyzed result to produce the visualized attribute factor analyzed result; and
analyze whether or not there is the dependency between the feature quantity of a face-part of the normalized face image data and the impression of the appearance of the face.

6. The attribute factor analysis device according to claim 5, wherein the processing circuitry is further configured to adjust the predetermined sample size by calculating in advance a magnitude of a correlation between the explanatory variable and the objective variable for the normalized face image data on each part.

7. The attribute factor analysis device according to claim 5,
wherein the processing circuitry is configured to divide the image region of the normalized face image data into the parts of the predetermined sample size while shifting a division position of the image region of the normalized face image data by a predetermined number of pixels;
obtain the regression model for each of the shifted parts;
calculate the dependencies in parallel for the respective shifted parts to obtain a plurality of attribute factor analyzed results; and
integrate the plurality of attribute factor analyzed results, visualize the integrated attribute factor analyzed result, and produce the visualized attribute factor analyzed result.

8. The attribute factor analysis device according to claim 5, wherein the feature quantity of the face image data comprises any one selected from feature quantities comprising RGB, gray scale, Laplacian, and Haar-like feature quantity.

9. The attribute factor analysis device according to claim 5, wherein the impression comprises at least one selected from among impressions comprising "cheerfulness and friendliness", "prettiness", and "business appropriateness".

10. An attribute estimation and attribute factor analysis device, which is configured to estimate an attribute of input face image data and analyze a factor of the attribute, the attribute estimation and attribute factor analysis device comprising:
a memory that stores a training sample set comprising training samples each being a combination of reference face image data and attribute data associated with the reference face image data, the attribute data comprising data representing an impression of appearance of a face;
processing circuitry configured to:
normalize the reference face image data at a position of both eyes of the face to produce normalized reference face image data:
divide an image region of the normalized reference face image data constituting each training sample of the training sample set into parts of a predetermined sample size in a mesh shape;
perform sparse regression analysis for each of the parts based on the training sample set to construct a regression model;
estimate, with use of the regression model, the attribute of the input face image data, and calculate, for the input face image data, a dependency between an explanatory variable representing a feature quantity of the input face image data on each part and an objective variable representing the estimated attribute to obtain an attribute estimated result and an attribute factor analyzed result of the input face image data; and
visualize the attribute estimated result and the attribute factor analyzed result to produce the visualized attribute estimated result and attribute factor analyzed result.

11. The attribute estimation and attribute factor analysis device according to claim 10, wherein the processing circuitry is further configured to adjust the predetermined sample size by calculating in advance a magnitude of a correlation between the explanatory variable and the objective variable for the normalized reference face image data on each part.

12. The attribute estimation and attribute factor analysis device according to claim 10, wherein the processing circuitry is configured to divide, for each training sample of the training sample set, the image region of the normalized reference face image data into the parts of the predetermined sample size while shifting a division position of the image region of the normalized reference face image data by a predetermined number of pixels;

construct the regression model for each of the shifted parts;

estimate the attributes and calculate the dependencies in parallel for the respective shifted parts to obtain a plurality of attribute estimated results and a plurality of attribute factor analyzed results; and integrate the plurality of attribute estimated results and the plurality of attribute factor analyzed results, visualize the integrated attribute estimated result and attribute factor analyzed result, and produce the visualized attribute estimated result and attribute factor analyzed result.

13. The attribute estimation and attribute factor analysis device according to claim 10, wherein the feature quantity of the reference face image data comprises any one selected from feature quantities comprising RGB, gray scale, Laplacian, and Haar-like feature quantity.

14. The attribute estimation and attribute factor analysis device according to claim 10, wherein the impression comprises at least one selected from among impressions comprising "cheerfulness and friendliness", "prettiness", and "business appropriateness".

* * * * *